United States Patent [19]

Otto

[11] 4,448,461
[45] May 15, 1984

[54] SELF-VENTING SEAL

[75] Inventor: Dennis L. Otto, Malvern, Ohio

[73] Assignee: The Timken Company, Canton, Ohio

[21] Appl. No.: 358,683

[22] Filed: Mar. 16, 1982

[51] Int. Cl.³ ............................................. F16C 33/76
[52] U.S. Cl. .................................. 308/187.2; 277/29; 277/50; 277/152
[58] Field of Search ................ 308/187.1, 187.2, 187; 384/130, 140, 146, 147, 153; 277/3, 27, 28, 29, 35, 37, 50, 152, 153, 166

[56] References Cited

U.S. PATENT DOCUMENTS

| | | | |
|---|---|---|---|
| 2,830,832 | 4/1958 | Moorman et al. | 277/29 |
| 3,314,735 | 4/1967 | Kocian | 308/187.2 |
| 3,748,003 | 7/1973 | Barber | 308/187.1 |
| 3,858,950 | 1/1975 | Otto | 308/187.1 |
| 4,043,620 | 8/1977 | Otto | 308/187.2 |
| 4,106,781 | 8/1978 | Benjamin et al. | 277/152 X |
| 4,337,956 | 7/1982 | Hopper | 277/29 |
| 4,344,631 | 8/1982 | Winn | 277/29 |

Primary Examiner—Stuart S. Levy
Assistant Examiner—David Werner
Attorney, Agent, or Firm—Gravely, Lieder & Woodruff

[57] ABSTRACT

A seal for closing a bearing cavity that has a bore and a wear surface at its end includes an elastomeric retaining band that fits snugly against the wall of the bore, an elastomeric seal lip that contacts the wear surface and creates a barrier to the passage of fluid along that surface as the surface rotates relative to the seal or vice-versa, and an impervious connecting section that extends between the retaining band and the seal lip. The retaining band contains several axially directed channels that communicate with the bearing cavity and are normally closed and isolated from the ambient atmosphere by flaps which are formed integral with the band and are highly flexible. As a consequence, the flaps will flex when subjected to a slight increase in pressure within the bearing cavity so as to expose the channels to the ambient atmosphere and thereby vent the bearing cavity.

18 Claims, 5 Drawing Figures

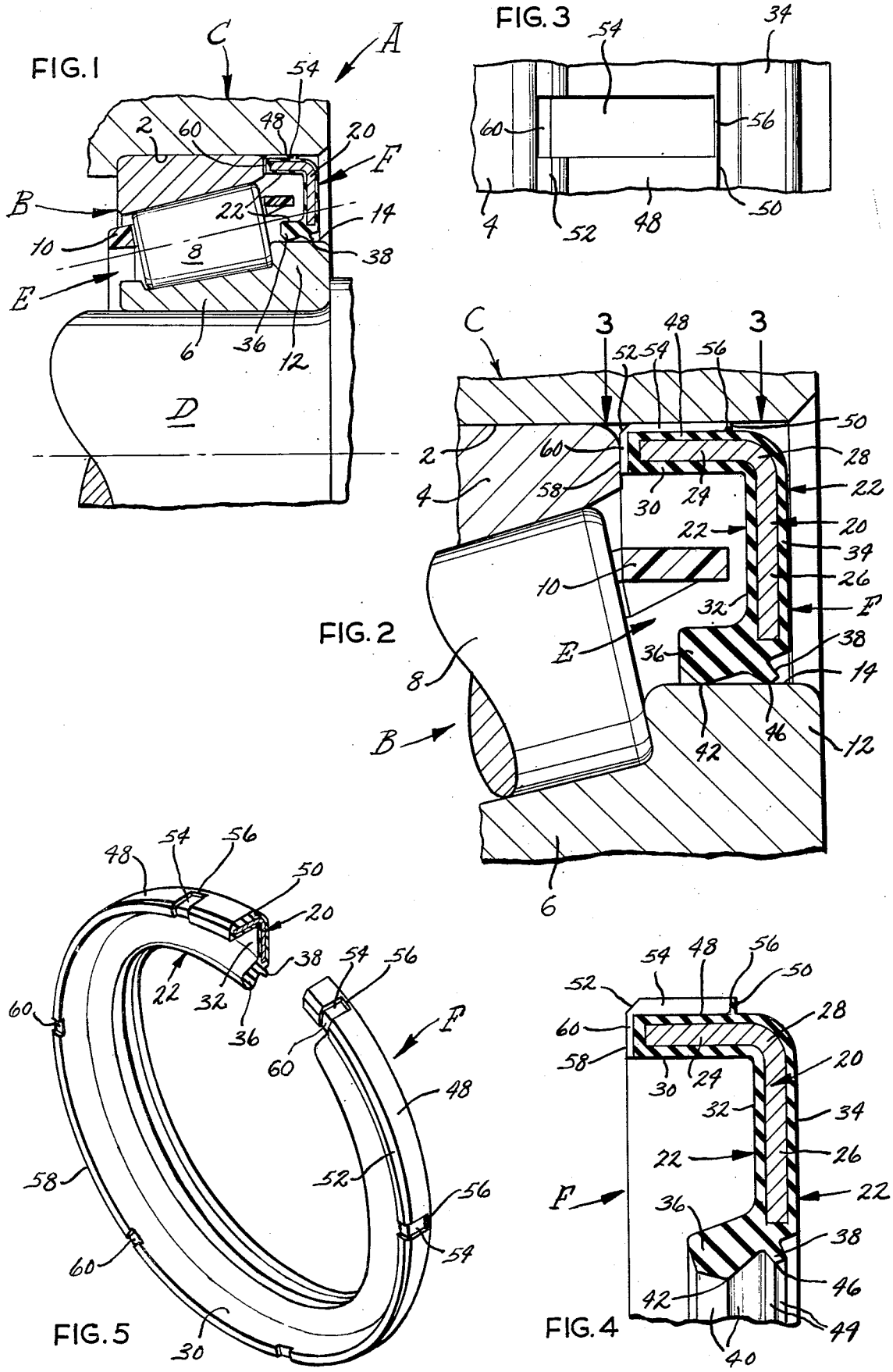

SELF-VENTING SEAL

BACKGROUND OF THE INVENTION

This invention relates in general to seals and more particularly to a self-venting seal for use with a bearing and to an assembly including such a seal.

Several basic mounting arrangements exist for the wheel bearings installed in automobiles of current manufacture. In perhaps the most common, a pair of angular bearings, such as single row tapered roller bearings, are positioned between a dead spindle and a rotatable hub, the outer races of the two bearings being fitted to the hub and the inner races around the spindle. The dead spindle may be on the steering knuckle of a rear wheel drive automobile, or on the rear axle or rear swing arm of a front wheel drive automobile. In another common arrangement used at the front wheel locations of front wheel drive automobiles, again two rows of rolling elements are employed, but the outer races remain stationary in the steering knuckle, while the inner races revolve with a drive flange that is coupled to a driven axle through a universal joint. In still another arrangement that is common to the rear wheel locations of rear wheel drive automobiles, one single row bearing is employed at each wheel, it having its outer race fitted to the axle housing and its inner race around the axle. Of course, many variations of these basic arrangements exist.

Irrespective of the bearing arrangement, the bearings are confined to a space or cavity that is isolated from the surrounding atmosphere by a seal, which is typically a lip-type seal. The seal retains lubricants within the bearing cavity and further prevents contaminants from entering the cavity.

The typical seal used with automotive wheel bearings has a metal case, which fits into a bearing housing, such as a hub or steering knuckle, or into the outer race of the bearing itself, and an elastomeric lip that bears against a wear surface which may be on or adjacent to the inner race of the bearing. The seal lip forms a barrier to the passage of fluid along the wear surface as the inner race rotates relative to the seal and outer race or vice-versa. The lip is somewhat delicate, and to prevent it from being damaged during operation of the bearing and to orient it properly for sealing efficiency, the lip turns axially inwardly toward the cavity in which the bearing is contained. Thus, a moderate increase in pressure within that cavity will impose a radially directed force on the lip, causing the lip to bear with greater force against the wear surface. This in turn causes the seal to heat up and deteriorate during operation. The elevated temperatures further cause the lubricant in the region of the seal to lose its effectiveness, which in turn compounds the problem. A substantial increase in pressure within the bearing cavity may have more damaging consequences, for a large pressure differential may cause the seal to actually blow out of the bearing cavity, in which case the lubricant will be lost and contaminants may enter the bearing cavity.

Perhaps braking is the most common cause of pressure increases within the bearing cavities of wheel bearings. In this regard, the bearings and the cavities in which they are isolated are invariably located next to brake drums or disks. Repeated applications of the brake cause the drums or disks to heat up and some of the heat is conducted into the hub or drive flange on which the bearings are mounted. This, is particularly true of automobiles of current manufacture, for the drive trains in these vehicles have extremely low drag and thereby shift more of the braking effort to the brakes themselves. Moreover, the wheels, hubs, drive flanges, and other wheel components found on automobiles of current manufacture have less mass than their earlier counterparts and therefore less area from which to dissipate the heat. As a consequence, more heat soaks back into the bearing cavity and that cavity operates at a higher temperature and pressure.

Some bearing arrangements have fittings through which a lubricant can be introduced under pressure into the bearing cavity. These arrangements are further susceptible to developing excessive pressures in their bearing cavities during the addition of lubricant to the cavities.

Heretofore vents have been incorporated into seals that have been utilized with bearings, but these vents have for the most part been confined to larger seals of the type used at the journals of railcar axles. The seals used with automotive wheel bearings are considerably smaller, and very little free area exists on such seals for accommodating an operative vent.

SUMMARY OF THE INVENTION

One of the principal objects is to provide a lip-type seal with a vent for relieving pressure increases within the region isolated by the seal. Another object is to provide a seal of the type stated that can be made in relatively small sizes and is therefore ideally suited for isolating the cavities in which automotive wheel bearings are housed. A further object is to provide a seal that is simple in construction and easy to install. These and other objects and advantages will become apparent hereinafter.

The present invention resides in a seal having a retaining band adapted to snugly contact the wall of a bore, a flexible lip adapted to contact and form a barrier to the passage of fluid along a wear surface that rotates relative to the seal, and an impervious intermediate portion that extends between the retaining band and seal lip. The retaining band contains channels which communicate with the region that is isolated by the seal and also flaps which normally close the channels. The flaps are quite flexible and are exposed to the ambient atmosphere, so that when the pressure increases in the isolated region, the flaps will flex and vent the channels and the isolated region to the ambient atmosphere so as to relieve the pressure. The invention also includes an assembly including a housing, a shaft, a bearing between the shaft and housing, and the seal installed to isolate the cavity in which the bearing is disposed. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

FIG. 1 is a fragmentary sectional view of a wheel assembly having a bearing that is fitted with a self-venting seal constructed in accordance with and embodying the present invention;

FIG. 2 is an enlarged sectional view of the seal installed in a bearing housing and fitted around a wear surface;

FIG. 3 is a sectional view taken along line 3—3 of FIG. 2 and illustrating one of the vent grooves of the seal and the flap at the end of that vent groove;

FIG. 4 is a sectional view of the seal itself with its retaining band and seal and dust lips undistorted; and FIG. 5 is a perspective view, partially broken away and in section, of the seal.

DETAILED DESCRIPTION

Referring now to the drawings (FIG. 1), a wheel assembly A includes an antifriction bearing B that fits within a housing C, such as a wheel hub, and over a shaft D, such as wheel spindle, to enable the housing C to rotate freely with respect to a shaft or vice-versa. In effect the bearing B fits into an annular bearing cavity E that is within the housing A and around the shaft D, and the end of this cavity is closed by a seal F to prevent a lubricant that is within the bearing B from escaping and to further prevent contaminants, such as dust and water, from entering the cavity E and damaging the bearing B. The seal F possesses the capability of venting the cavity E.

The bearing B fits within the housing C which contains a bore 2 that receives the bearing B (FIGS. 1 & 2). Typically, the bearing B is a tapered roller bearing having a cup 4 that fits snugly into the housing bore 2, a cone 6 that is located within the cup 4 and fits around the shaft D, tapered rollers 8 arranged in a single row between raceways on the cup 4 and cone 6, and a cage 10 to maintain the correct spacing between the tapered rollers 8. By reason of the tapered geometry in the cup 4, cone 6, and rollers 8, a radial load transmitted through the bearing B will at the rollers 8 resolve into an axial component which urges the rollers 8 toward the large ends of the raceways for the cup 4 and cone 6. To prevent the rollers 8 from being expelled from the space between the cup 4 and cone 6, the cone 6 is provided with a thrust rib 12 that projects outwardly from the large diameter end of the cone raceway and serves as an abutment against which the large diameter ends of the tapered rollers 8 bear. The thrust rib 12 extends outwardly to the back face of the cone 6 and has a cylindrical surface 14 that is presented outwardly and is located axially beyond the front face of the cup 4, yet is within the housing bore 2 which extends beyond the front face of the cup 4. The cylindrical surface 14, like the remaining surface of the cone 6, is typically case hardened and serves as a wear surface for the seal F.

The seal F (FIG. 2) fits into the housing bore 2 immediately beyond the cup 4 and extends radially inwardly to the thrust rib 12, which it contacts, so as to form a substantially fluid-tight barrier along the wear surface 14 and housing bore 2. In its most basic form the seal comprises a grooved retaining band that is along the housing bore 2, a seal lip that contacts the surface 14 of the cone thrust rib 12, and a connecting portion between the retaining band and seal lip, all as will become apparent. More specifically, the seal F includes an annular rigidifying element 20 and an elastomeric portion 22 that completely envelopes the rigidifying element 20. The rigidifying portion is formed from a relatively rigid substance such as steel, while the elastomeric portion, as its name implies, is formed from an elastomer which is somewhat flexible and is molded around the rigidifying element such that the elastomer of the portion 22 is bonded to the steel of the element 20. The elastomer must remain chemically stable in the presence of lubricants that are used in the bearing B. One such elastomer is oil resistant nitrile.

The rigidifying element 20 is embedded entirely within the elastomeric portion 22 and in cross-section possesses an L-shaped configuration (FIG. 2), it having an axially directed leg 24 and a radially directed leg 26, with the two legs 24 and 26 being joined at a corner 28. The axially directed leg 24 lies close to the wall of the bore 2 in the housing C, but by reason of the enveloping elastomeric portion 22, it does not contact the wall of the bore 2. Its free end is located close to the front face of the cup 4, but again does not contact that surface. At its opposite end, which is located close to the end of the bore 2, the axial leg 24 merges into the radial leg 26 which projects inwardly toward the thrust rib 12. However, the free end of the radial leg is spaced outwardly from the cylindrical surface 14 on the thrust rib 12.

The enveloping elastomeric portion 22 is molded around the steel rigidifying element 20 (FIG. 2) and includes a thin layer 30 which covers that surface of the axial leg 24 that is presented toward the bearing, another layer 32 which covers that surface of the radial leg 26 which is likewise presented toward the bearing cavity E, and still another layer 34 which covers the opposite surface of the radial leg 26 and further extends over the outside surface of the corner 28. All three layers 30, 32 and 34 are of uniform and substantially equal thickness. Moreover, the layer 30 joins the layer 32 at the corner 28.

The inside layer 32 that is along the radial leg 26 merges into a fluid lip 36 (FIG. 2) while the outside layer 34 merges into a dust lip 38. The two lips 36 and 38 are joined together as an integral unit immediately inwardly from the free end of the radial leg 26 and both contact cylindrical surface 14 on the thrust rib 12 of the cone 6.

More specifically, the fluid lip 36 projects axially inwardly from the free end of the radial leg 26 such that it is encircled by the large end of the cage 10. Accordingly, the fluid lip 36 is not exposed at the exterior of the wheel assembly and therefore is well protected from debris or external forces that might otherwise damage it. The fluid lip 36 has two beveled surfaces 40 that converge toward a sealing edge 42, and it is along the edge 42 that the fluid lip 36 contacts the cylindrical surface 14 of the thrust rib 12. The dust lip 38 is likewise composed of beveled surfaces 44 that converge toward an edge 46 along which the dust lip 38 contacts the cylindrical surface 14. The fluid lip 36 forms a barrier to the passage of lubricant and fluids in general along the surface 14 and thereby keeps the lubricant that is within the bearing B from escaping. The dust lip 38 prevents dust, water and other contaminants from entering the bearing cavity E.

In addition to the three thin layers 30, 32 and 34 and the two lips 36 and 38, the elastomeric portion 22 of the seal F also includes a retaining band 48 (FIG. 2) that extends along the outwardly presented surface of the axial leg 24 for the rigidifying element 20 and fits snugly within the bore 2 of the housing C so as to secure the seal in a fixed position with respect to the housing C. To this end the retaining band 48 when undistorted (FIG. 4) has an outer diameter that is somewhat greater than the housing bore 2, as opposed to the segment of the layer 34 that extends around the corner 28. That segment is at its greater diameter, that is where it merges with the band 48, smaller than the diameter of the housing bore 2 (FIG. 2). Indeed, the thin layer 34 and the band 48 merge at a shoulder 50 which is located along the axial leg 24 immediately before the corner 28. At its opposite end the band 48 is provided with a bevel 52 which during installation of the seal F serves to properly align the band 48 with the bore 2. Once aligned, the seal F is forced into the bore 2, whereupon the band 48 is compressed and snugly grips the wall of the housing bore 2. The friction between the band 48 and wall of the housing bore 2 secures the seal F firmly within the housing C. Even though the band 48 is compressed, the shoulder 50 remains discernible, for an annular space exists between the wall of the housing bore 2 and the large end of the thin layer 34, that is the portion of the layer 34 that extends over the outside surface of the corner 28 on the rigidifying element 20.

The retaining band 48 contains several vent channels or grooves 54 (FIGS. 2-5) that extend axially through it at equal circumferential intervals and open outwardly toward the wall of the housing bore 2. Usually six grooves 54 will suffice, and each extends to a depth greater than the wall of the housing bore 2, so that the grooves 54 are not totally obliterated when the seal F is forced into the housing bore 2 (FIG. 2). Actually, the diameter at which the base of each groove 54 is located is about the same as the greatest diameter for the thin outside layer 34 that extends around the corner 30. At one of its ends each groove 54 opens out of the bevel 52 and that end of the retaining band 48 faces the cup 4. The opposite end of each groove 54 is closed by a flap 56 which is formed integral with the band 48 and is quite thin and highly flexible. When the band 48 is undistorted, that is when the seal F is detached from the housing C, the flaps 56 form continuations of the shoulder 50 and are indiscernible when viewed from the normally exposed end of the seal F (FIGS. 4 & 5). When the retaining band 48 is compressed, as it is when the seal F is in the housing C, the flaps 56 provide narrow continuous contact with the bore 2 so that they statically seal the bearing cavity E (FIG. 2). Again there is no evidence of the presence of the flaps 56 when viewed from the normally exposed end of the seal F.

Finally, the elastomeric portion 22 of the seal F has a stop 58 (FIG. 2) which is formed integral with the ends of the thin layer 30 and the retaining band 48 on the axial leg 24 of the rigidifying element 20. As such, the stop 58 projects beyond the free end of the axial leg 24 for the rigidifying element 20. The stop 58 aligns with and may abut against the front face of the cup 4, in which case the cup 4 determines the axial position of the seal F. On the other hand, the stop 58 may be spaced from the front face of the cup 4. In either case, the stop 58 contains several vent channels or grooves 60 (FIGS. 2-5) which open out of its exposed face and connect with the vent grooves 54 that open out of the retaining band 48, the juncture of the two sets of grooves 48 and 54 being located inwardly from the bevel 52.

The seal F is installed in the housing C by aligning the retaining band 48 of the former with the bore 2 of the latter. Then an axially directed force is applied to seal F along the elastomeric layer 34 that covers the radial leg 26 of the rigidifying element 20, and this force drives the retaining band 48 into the bore 2 of the housing C. The bevel 52 on the end of the band 48 serves to center the seal F with respect to the bore 2 and to further initiate a compression of the band 48 so that it will fit into the bore 2. Normally, a chamfer will exist at the end of the bore 2 to cooperate with the bevel 52 in leading the band 48 into the bore 2. As the retaining band 48 is forced into the bore 2, the fluid lip 36 is expanded slightly to enable it to fit over the cone thrust rib 12. In any event, the seal F is advanced until it is contained fully within the bore, and normally when so disposed, the retaining band 48 snugly grips the wall of the bore 2 and the stop 58 may abut the front face of the cup 4. Even though the retaining band 48 is somewhat compressed in the housing bore 2, the vent grooves 54 remain, and they communicate with the bearing cavity E through the vent grooves 60 in the stop 58 (FIG. 2). The flaps 56, however, close the ends of the vent grooves 54 and prevent contaminants from entering the grooves 48 and the bearing cavity E which lies beyond them.

The flaps 56 along the shoulder 50 of the retaining band 48 are, however, quite flexible, and should the pressure within the bearing cavity E increase, this elevated pressure will be transmitted through vent grooves 54 and 60 to the flaps 56 which will be displaced outwardly. In moving outwardly the flaps 56 open the ends of the vent grooves 54, and accordingly the elevated pressure within the bearing cavity E is relieved. This in turn preserves the fluid lip 36, for the force with which it bears against the surface 14 remains at a safe level. It also prevents the seal F from being blown out of the housing C.

Thus, the bearing B can operate at high temperatures, yet the increase in temperature will not produce a corresponding increase in pressure within the bearing cavity E. Similarly, even if too much lubricant is forced under pressure into the cavity E during lubrication of the bearing B, the pressure in the lubricant will not build up. Instead, the excess lubricant will escape through the vent grooves 60 and 54 in that order.

Since the vent flaps 56 are located along a dead or static interface, they remain virtually unaffected during the operation of the bearing B. Moreover, they are at location which is somewhat protected, and as a consequence they are less likely to allow contaminants to enter the bearing B.

In lieu of fitting the retaining band 48 directly to the bore 2 of the housing C, the cup 4 may be provided with an extension having a bore, and the retaining band 48 may be sized to fit that bore. Similarly, the lips 36 and 38 of the seal F may bear against a wear surface other than the cylindrical surface 14 of the thrust rib 12. For example they may contact the surface of the shaft D or a collar fitted around the shaft beyond the cone 6.

In summary, the seal F in its most basic form has three primary components or sections, namely the elastomeric retaining band 48 with its axial vent grooves 54, the seal lip 36, and an intermediate connecting section or portion that extends between the band 48 and the lip 36. That section or portion is impervious to fluids and includes the rigidifying element 20 as well as the thin elastomeric layers 30, 32 and 34 which cover it.

This invention is intended to cover all changes and modifications of the example of the invention herein chosen for purposes of the disclosure which do not constitute departures from the spirit and scope of the invention.

What is claimed is:

1. In an assembly including a shaft, a housing surrounding the shaft and containing a bearing cavity, a bearing located within the bearing cavity for enabling the housing to rotate relative to the shaft or vice-versa, there further being a bore and a wear surface at the end of the bearing cavity with the wear surface being located generally within the bore, an improved seal for closing the end of the cavity at the bore and wear surface, said seal comprising: a retaining band fitted into snug-fitting contact with the wall of the bore such that it does not rotate relative to the bore and having radially outwardly opening channels which communicate with the bearing cavity and means which normally bear against and contact the wall of the bore to close the channels but will separate from the wall of the bore and open the channels in response to a slight increase in pressure within the bearing cavity so as to expose the channels to the ambient atmosphere, whereby the bearing cavity is vented; a seal lip contacting the wear surface and forming a barrier to the passage of fluid along the wear surface while the wear surface moves relative to the lip or vice-versa; and an impervious intermediate member extending between the retaining band and the lip.

2. The structure according to claim 1 wherein the means for closing the channels are flaps formed on the retaining band.

3. The structure according to claim 2 wherein the retaining band and seal lip are formed from an elastomer.

4. The structure according to claim 3 wherein the retaining band is in a state of compression within the bore.

5. The structure according to claim 3 wherein the retaining band has a shoulder that is exposed to the ambient atmosphere and the flaps are along the shoulder.

6. The structure according to claim 2 wherein the intermediate portion includes a metal rigidifying element to which the retaining band is bonded.

7. A seal for closing the space between a wear surface and the surrounding wall of a bore, said seal comprising: a retaining band formed from a material adapted to contact and seal against the bore, the retaining band having channels which extend along it and further at its one end having a shoulder; flexible flaps attached to the retaining band along the shoulder and normally closing the channels, the flaps being adapted to flex and open the channels in the presence of a pressure differential across them; a stop at the other end of the retaining band, the stop having channels which extend through it and further open into the ends of the channels in the retaining band; a flexible lip positioned and configured to contact the wear surface so as to form a barrier to the passage of fluid along that surface while the surface moves relative to the seal or vice-versa; and an impervious intermediate portion extending between the band and the lip; whereby the aligned channels in the stop and retaining band and the flaps at the ends of the channels in the latter enable the pressure on each side of the flexible lip and the intermediate portion to generally equalize.

8. A seal according to claim 7 wherein the stop is formed from an elastomer.

9. A seal according to claim 8 wherein the retaining band is annular and the channels within it extend generally axially, while the channels within the stop extend generally radially.

10. A seal for closing the space between a wear surface and the wall of a bore, said seal comprising: a retaining band formed from an elastomeric material in a generally cylindrical configuration and being sized to snugly fit into the bore such that it will seal against the wall of the bore without rotating relative to the bore, the retaining band containing generally axially directed channels which extend generally from one end of the retaining band to the other and open radially outwardly; flexible flaps attached to the retaining band at the channels such that the flaps extend outwardly to generally the outer surface of the retaining band and normally close the channels, the flaps further being positioned such that on one side they will be exposed to the ambient atmosphere when the retaining band is in the bore, the flaps being adapted to flex and open the channels in the presence of a pressure differential across them; a flexible lip positioned and configured to contact the wear surface and form a barrier to the passage of fluid along that surface while the surface moves relative to the seal or vice-versa; and an impervious intermediate portion extending between the band and the lip, whereby the seal will close the space between the wear surface and the wall of the bore, yet will prevent excessive pressure differentials from developing across the seal.

11. A seal according to claim 10 wherein the retaining band terminates at its one end at a shoulder and the flaps are along the shoulder.

12. A seal according to claim 10 wherein the intermediate portion includes a metal rigidifying element.

13. A seal according to claim 12 wherein the rigidifying element is generally L-shaped in cross-sectional configuration and the elastomeric retaining band is bonded to one leg of the L-shaped configuration and the seal lip is attached to the other leg.

14. In an assembly including first and second members, one of which generally surrounds the other such that an annular space exists between the two members, the first member having a generally cylindrical surface and the second member having a wear surface located generally opposite the cylindrical surface on the first member, an improved seal for closing the annular space between the first and second members, said seal comprising: a rigidifying element formed from a rigid material and having an axially directed portion located in close proximity to the cylindrical surface of the first member; an elastomeric retaining band attached to the axial portion of the rigidifying element and compressed between the axial portion and the cylindrical surface such that the retaining band is sealed against the cylindrical surface and does not rotate relative to the cylindrical surface, the retaining band having axially directed channels which extend substantially the full length of the retaining band and open toward the cylindrical surface; means on the retaining band for normally bearing against the cylindrical surface of the first member and closing the channels but for separating from the cylindrical surface and opening at least some of the channels in response to a slight increase in the pressure within the region on one side of the seal; and an elastomeric seal lip attached to the rigidifying element and contacting the wear surface to form a barrier to the passage of fluid along the wear surface while the wear surface moves relative to the lip or vice-versa, whereby the seal closes the space between the wear surface and the cylindrical surface, yet will prevent an excessive pressure differential from developing across the seal.

15. The combination according to claim 14 wherein the rigidifying element also includes a generally radially directed portion and the seal lip is attached to the radially directed portion.

16. The combination according to claim 15 wherein the retaining band has a shoulder at one of its ends, and the means for closing the channels are flexible elastomeric flaps formed integral with the retaining band and located along the shoulder and at the channels.

17. The combination according to claim 14 and further comprising an elastomeric stop formed integral with the retaining band at one end of the retaining band and extending generally radially, the stop having generally radially directed channels which align with and open into the channels of the retaining band so that the channels in the retaining band are not blocked when the seal is installed against a radially directed surface.

18. The combination according to claim 14 wherein the channels are spaced at equal circumferential intervals around the retaining band.

* * * * *